Sept. 12, 1933.   P. DROHNN   1,926,615
BALL
Filed Aug. 1, 1928
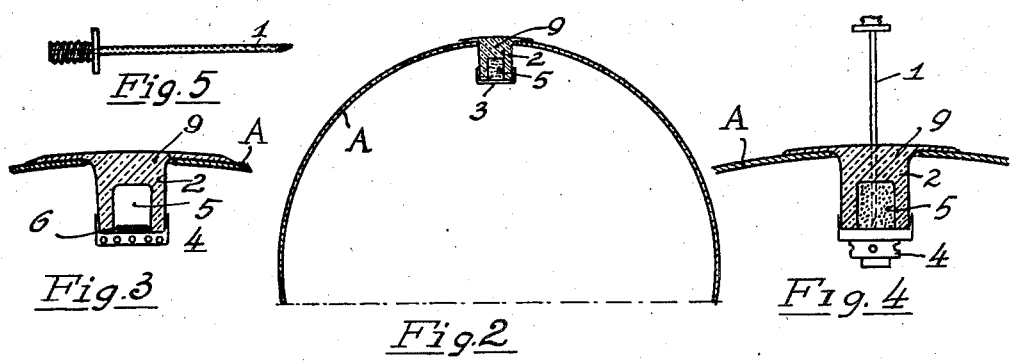
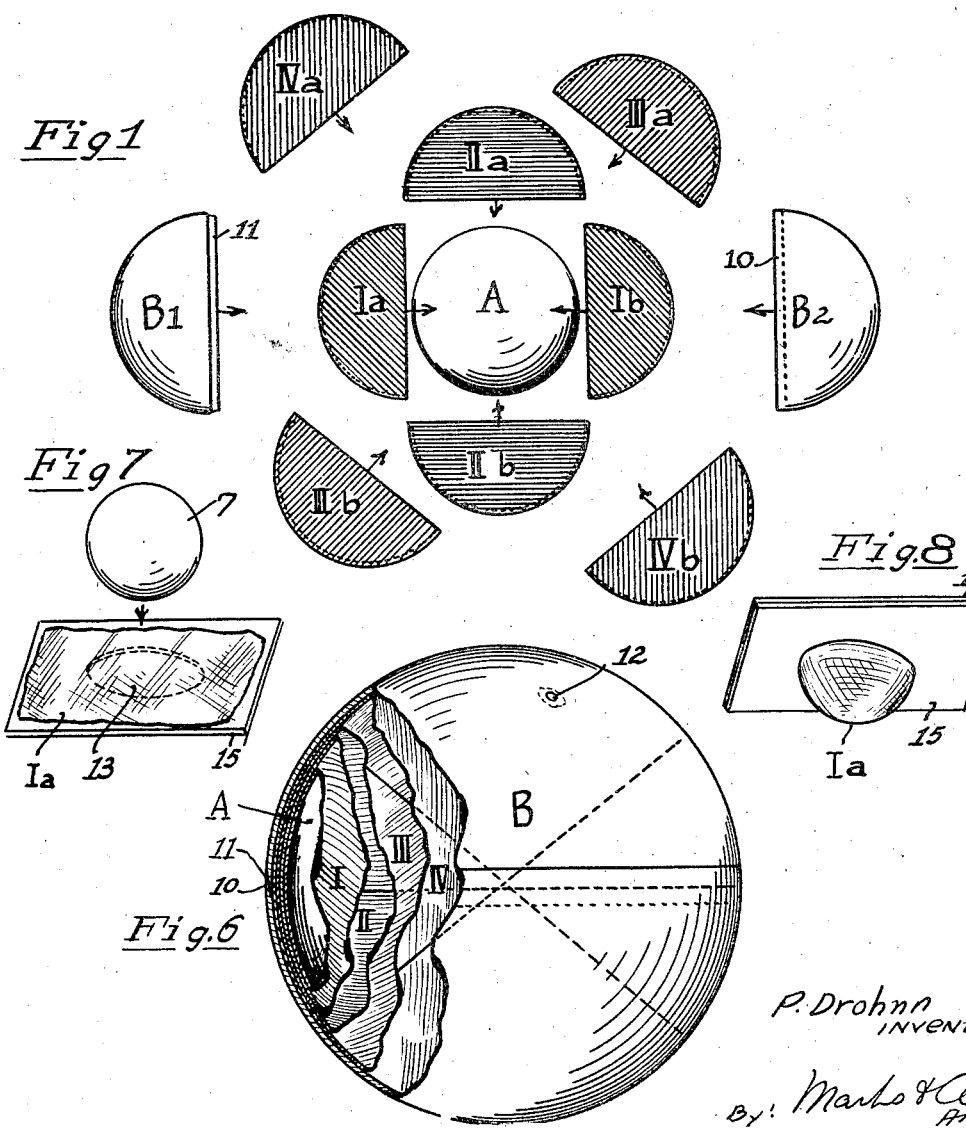

Patented Sept. 12, 1933

1,926,615

UNITED STATES PATENT OFFICE 1,926,615

BALL

Paul Drohnn, Wolfenbuttel, Germany

Application August 1, 1928, Serial No. 296,720, and in Germany August 9, 1927

6 Claims. (Cl. 273—65)

This invention relates to footballs or the like. Such balls can only be kicked accurately if they are absolutely round. The new ball fulfils this condition in a very high degree.

According to the invention the outer cover has no opening for the introduction of the bladder, so that there is also no lacing required, which would prevent the ball being round. A further object of the invention is the provision of means for maintaining the bladder in a round form by reinforcing covers, so that it cannot change its shape even when in use. A further object of the invention consists in a peculiar way of introducing the air into the bladder.

In the accompanying drawing several constructional examples of the invention are illustrated.

Fig. 1 shows how the bladder is enclosed in its reinforcing covers and its outer cover.

Fig. 2 shows in section to an enlarged scale a portion of the bladder with a place for the introduction of the air.

Figs. 3 and 4 show two further arrangements for introducing air into the bladder.

Fig. 5 is a hollow needle for use in inflating the new ball.

Fig. 6 shows the finished ball with the various covering layers partly exposed, and Figs. 7 and 8 show diagrammatically how the various covers are produced.

According to the invention the rubber bladder A has no valve opening of any kind. It is provided with internal means for sealing leakages. The bladder is inflated by means of a hollow needle 1 which pierces the wall of the bladder and is adapted to be screwed to a pump. On the needle being withdrawn, the means referred to seal the puncture in the wall of the bladder automatically. For this purpose the bladder A is provided, as shown in Fig. 2, on the inside with a boss 2 which is cut out below to form a hollow space 5. This boss 2 forms the piercing place for the needle 1 referred to, with which the wall 9 has to be freshly pierced each time the ball is inflated. Into the hollow space 5 of the boss 2, which is open at the bottom, a mixture of non-porous granules and a solution having no action on rubber, for instance melted rubber, is introduced, the said mixture being prevented from falling out of the hollow space 5 by a rubber, leather or the like woven fabric disc 3, which closes the hollow space from below. The needle 1 pierces through the said mixture and the disc 3 and, on being withdrawn, it draws a granule from the more or less sticky mass in front of or into the pierced hole, thereby sealing it hermetically.

According to the constructional form shown in Fig. 3 the self-sealing granular mixture according to Fig. 2 is replaced by a non-return valve 4 of any suitable kind, which is placed on the lower end of the boss 2. In this case the needle is only inserted as far as the interior of the hollow space 5, for instance, until it reaches a metal protective plate 6. As shown in Fig. 4, in addition to the provision of the non-return valve 4 the hollow space 5 may be filled with the mixture referred to above.

Such a bladder A is covered, as indicated in Fig. 1, by a plurality of covers of woven fabric in the following manner: the bladder A is inflated to the desired size and pressure. Two, for instance hemispherical, pieces of material Ia and Ib are thereupon placed round the bladder and fixed to it by an adhesive. These pieces of material for instance linen or the like are previously pressed on a woden model of the size and shape of the bladder say by the piece of material being stretched, as shown in Fig. 7, between two boards 14 and 15 having a round opening 13 into which a wooden ball 7 is forced, the ball forcing the material downwards through the opening and giving it a hemispherical shape (Fig. 8). It is obvious that the threads in the fabric will be stretched and will therefore subsequently, when the fabric has been stuck on to the bladder, not be able to give any more under the action of kicks, when the ball is being used. Thus, Ia and Ib form a cover I which is firmly united with the bladder. Over this cover a second cover of fabric consisting of the halves IIa and IIb is stuck with adhesive in such a manner that the threads of the cover II cross the threads of the cover I.

In the drawing this is indicated by shading which is intended to show the position of the warp threads in the fabric. Furthermore, the two halves IIa and IIb are stuck on in such a manner that their joint is offset with respect to the joint of the half covers Ia and Ib. In a similar manner a further cover composed of the halves IIIa and IIIb is stuck over the cover II and a cover IVa and IVb over the cover IIIa and IIIb. The threads of two contiguous fabric covers always cross one another and the joints where the edges of the half covers meet are in every case offset with respect to one another. In this way a ball is produced the wall of which is practically without a joint and is of equal strength all over in the manner of plywood structures, so that even the severest blows cannot change the shape of the ball, causing it to become non-spherical. More or less than four covers of material can of course be stuck on the bladder. The manner of attaching the parts of the covers as described has the advantage that the spherical shape is continuously corrected. Instead of hemispheres, any other portions of spheres may of course be used. The ball produced in this manner is given a final cover of some resistant material, preferably leather or the like, as this is better qualified than rubber to withstand the great friction on the ground to which such a ball is subjected. Parts of any suitable shape, for producing a spherical cover may be used. In the example shown, two hemispherical portions B1, B2, analogous to the fabric covers, are formed from leather by pressure. The edges 10 and 11 of the parts are overlapped and stuck together with adhesive. For this purpose the edges 10, 11 are skived in such a manner that, when slipped one over the other, they do not exceed the thickness of the remainder of the wall of the cover, as shown to the left in Fig. 6. The edges 10, 11 after being slipped one over the other and after being preferably roughened are stuck together with rubber solution and the like. When rubber solution is used, the joint may easily be vulcanized with a sulphur solution by a cold process.

The new ball is practically without joints and projections and is therefore absolutely smooth and round, and it cannot lose its round shape, as the fabric covers I to IV absolutely prevent this.

If the bladder is not to be provided with one of the well known self sealing means, but with a boss 2 for piercing with the needle 1, as shown in Figs. 2 to 4, the place to be pierced must be marked on the leather cover B, for instance by a cut in circle 12 (Fig. 6), within which the needle 1 is inserted, the walls of the covers I to IV and the boss 9 being pierced by the needle.

What I claim is:

1. A ball, comprising in combination a bladder and a plurality of divided superposed covers of textile material for the said bladder, the parts of the covers being previously blocked to shape so that their threads are in tension and being so positioned with respect to one another that their warp threads cross one another and their joints are offset with respect to one another, as and for the purpose set forth.

2. A ball, comprising in combination a bladder, having no valve opening, self-sealing means within the bladder, consisting of a mixture of non-porous granules and a solution which does not attack rubber, and a plurality of divided superposed covers of textile material for the said bladder, the covers being so positioned with respect to one another that their warp threads cross one another and their joints are offset with respect to one another, as and for the purpose set forth.

3. A ball, comprising in combination a bladder, having no valve opening, self-sealing means within the bladder, consisting of a mixture of non-porous granules and liquefied rubber, and a plurality of divided superposed covers of textile material for the said bladder, the covers being so positioned with respect to one another that their warp threads cross one another and their joints are offset with respect to one another, as and for the purpose set forth.

4. A ball, comprising in combination a bladder and a plurality of divided superposed covers of textile material and an outer divided covering of leather for the said bladder, the covers consisting each of hemispherical pressed portions and being so positioned with respect to one another that their warp threads cross one another and their joints are offset with respect to one another, as and for the purpose set forth.

5. A ball, comprising in combination a bladder, and a plurality of divided superposed covers of textile material formed by pressing into the shape of a part of a spherical surface, the covers being so positioned with respect to one another that their warp threads cross one another and their joints are offset with respect to one another.

6. A ball comprising a bladder, an inwardly directed valve thereon, which is adapted to close of itself when a hollow needle used for introducing air is withdrawn, a plurality of layers of fabric, so positioned with respect to one another that the warp threads of one layer cross the warp threads of another layer, and the joints of one layer are offset with respect to those of another layer, forming a compact casing of woven material completely enclosing the ball and leaving no opening for the valve.

PAUL DROHNN.